US011413984B2

United States Patent
Yang et al.

(10) Patent No.: US 11,413,984 B2
(45) Date of Patent: Aug. 16, 2022

(54) APPARATUS AND METHOD FOR CHARGING AND DISCHARGING ELECTRIC VEHICLE UNDER SMART GRID ENVIRONMENT

(71) Applicants: HYUNDAI MOTOR COMPANY, Seoul (KR); KIA MOTORS CORPORATION, Seoul (KR); YURA CORPORATION CO., LTD., Seongnam-si (KR)

(72) Inventors: Chang Min Yang, Bucheon-si (KR); Ji Hwon Kim, Gwangmyeong-si (KR); Young Chan Kim, Seoul (KR); Hye Jin Song, Seoul (KR)

(73) Assignees: Hyundai Motor Company, Seoul (KR); Kia Motors Corporation, Seoul (KR); Yura Corporation Co., Ltd., Seongnam-si (KR)

( * ) Notice: Subject to any disclaimer, the term of this patent is extended or adjusted under 35 U.S.C. 154(b) by 684 days.

(21) Appl. No.: 15/833,908

(22) Filed: Dec. 6, 2017

(65) Prior Publication Data
US 2018/0312072 A1 Nov. 1, 2018

(30) Foreign Application Priority Data
Apr. 28, 2017 (KR) .......................... 10-2017-0055393

(51) Int. Cl.
*B60L 58/12* (2019.01)
*B60L 53/64* (2019.01)
(Continued)

(52) U.S. Cl.
CPC ............... *B60L 58/12* (2019.02); *B60L 50/50* (2019.02); *B60L 53/11* (2019.02); *B60L 53/305* (2019.02);
(Continued)

(58) Field of Classification Search
CPC .......... B60L 58/12; B60L 53/64; B60L 53/66; B60L 55/00; B60L 53/62; B60L 50/50;
(Continued)

(56) References Cited

U.S. PATENT DOCUMENTS 6,087,806 A * 7/2000 Fujioka ................... B60L 53/32
320/109
8,610,401 B2 * 12/2013 Kim ........................ B60L 53/62
320/109
(Continued)

FOREIGN PATENT DOCUMENTS

JP 2001-008380 A 1/2001
JP 2017046421 A * 3/2017
KR 10-2014-0068384 A 6/2014

OTHER PUBLICATIONS

Korean Office Action dated Jul. 16, 2021 issued in Korean Patent Application No. 10-2017-0055393.

*Primary Examiner* — Jared Fureman
*Assistant Examiner* — Michael J Warmflash
(74) *Attorney, Agent, or Firm* — Morgan, Lewis & Bockius LLP

(57) ABSTRACT

An in-vehicle power system includes: a charging-discharging device configured to selectively perform both a charging function for receiving and delivering a first power signal and a discharging function for transmitting a second power signal; a battery configured to store an electrical energy transferred after DC conversion of the first power signal; and a charging-discharging controller configured to control the charging-discharging device based on a user's input or a predetermined control pattern.

15 Claims, 7 Drawing Sheets

(51) Int. Cl.
  *B60L 53/66* (2019.01)
  *B60L 55/00* (2019.01)
  *B60L 53/62* (2019.01)
  *B60L 50/50* (2019.01)
  *B60L 53/63* (2019.01)
  *B60L 53/30* (2019.01)
  *B60L 53/10* (2019.01)
  *B60L 53/67* (2019.01)

(52) U.S. Cl.
  CPC ............... *B60L 53/62* (2019.02); *B60L 53/63* (2019.02); *B60L 53/64* (2019.02); *B60L 53/66* (2019.02); *B60L 53/67* (2019.02); *B60L 55/00* (2019.02); *B60L 2240/545* (2013.01); *B60L 2240/80* (2013.01); *Y02T 90/167* (2013.01); *Y04S 30/12* (2013.01)

(58) Field of Classification Search
  CPC ........ B60L 53/63; B60L 53/305; B60L 53/11; B60L 53/67; B60L 11/1842; B60L 2240/80; B60L 2240/545; B60L 2200/24; B60L 53/60; B60L 53/665; B60L 2240/60; Y02T 90/167; Y02T 90/16; Y04S 30/12; H02J 3/008; H02J 7/0013; H02J 7/02; H02J 7/342; B60Y 2200/91
  See application file for complete search history.

(56) References Cited

U.S. PATENT DOCUMENTS

| | | | | |
|---|---|---|---|---|
| 9,493,086 | B2* | 11/2016 | Kinomura | B60L 53/62 |
| 9,527,399 | B2* | 12/2016 | Kim | B60L 58/13 |
| 9,656,565 | B2* | 5/2017 | Lee | B60L 53/60 |
| 9,895,990 | B2* | 2/2018 | Giusti | H02J 7/02 |
| 10,011,183 | B2* | 7/2018 | Shimizu | B60L 58/12 |
| 10,406,927 | B2* | 9/2019 | Baba | H02J 3/32 |
| 10,411,488 | B2* | 9/2019 | King | B60L 53/16 |
| 2007/0282495 | A1* | 12/2007 | Kempton | B60L 55/00 701/22 |
| 2008/0281663 | A1* | 11/2008 | Hakim | H02J 3/46 705/7.25 |
| 2009/0229900 | A1* | 9/2009 | Hafner | B60L 53/64 903/930 |
| 2010/0017045 | A1* | 1/2010 | Nesler | B60L 53/11 700/296 |
| 2010/0076825 | A1* | 3/2010 | Sato | B60L 55/00 705/14.1 |
| 2010/0164439 | A1* | 7/2010 | Ido | H02J 7/007194 320/155 |
| 2011/0115439 | A1* | 5/2011 | Kim | B60L 58/13 320/136 |
| 2011/0202217 | A1* | 8/2011 | Kempton | G06Q 30/0601 701/22 |
| 2011/0204720 | A1* | 8/2011 | Ruiz | B60L 53/305 307/66 |
| 2012/0169511 | A1* | 7/2012 | Windstrup | B60L 11/184 340/870.02 |
| 2012/0277923 | A1* | 11/2012 | Tsuchiya | H02J 3/381 700/291 |
| 2012/0286723 | A1* | 11/2012 | Ukita | G06Q 10/06312 320/107 |
| 2013/0020992 | A1* | 1/2013 | Wu | H04L 67/12 320/109 |
| 2013/0024035 | A1* | 1/2013 | Ito | B60L 53/65 700/291 |
| 2013/0057211 | A1* | 3/2013 | Kuribayashi | B60L 53/65 320/109 |
| 2013/0103355 | A1* | 4/2013 | Unagami | B60L 58/12 702/187 |
| 2014/0129829 | A1* | 5/2014 | Unagami | H02J 7/00047 713/158 |
| 2014/0203777 | A1* | 7/2014 | Flack | B60L 3/04 320/109 |
| 2014/0247019 | A1* | 9/2014 | Park | B60L 53/11 320/160 |
| 2015/0042288 | A1* | 2/2015 | Ishii | B60L 3/0046 320/135 |
| 2018/0236898 | A1* | 8/2018 | Ji | G01C 21/3697 |

* cited by examiner

| Fees(Rate) | Low | Medium | High |
|---|---|---|---|
| Charging Mode (Unconditional) | Vehicle: Full Charging<br>Home: Charging | Vehicle: Full Charging<br>Home: Charging | Vehicle: Full Charging<br>Home: No Charging |
| Charging Mode (Max.) | Vehicle: Full Charging<br>Home: Charging | Vehicle: Full Charging<br>Home: Charging | Vehicle: Charging up to set level<br>Home: No Charging |
| Charging Mode (Min.) | Vehicle: Full Charging<br>Home: Charging | Vehicle: Charging up to set level<br>Home: Charging | Vehicle: No Charging<br>Home: No Charging |

FIG.5

| Fees(Rate) | Low | Medium | High |
|---|---|---|---|
| Charging Mode | Charging | Vehicle, Home: Charging only when no low time zone until next operation | Vehicle: Only Quick Charging<br>Home: No Charging |
| Discharging Mode (Min.) | No Discharging | No Discharging | Vehicle: Discharging up to Min.<br>Home: Charging from Vehicle |

FIG.6

APPARATUS AND METHOD FOR CHARGING AND DISCHARGING ELECTRIC VEHICLE UNDER SMART GRID ENVIRONMENT

CROSS-REFERENCE TO RELATED APPLICATION

This application claims the benefit of priority to Korean Patent Application No. 10-2017-0055393, filed on Apr. 28, 2017 in the Korean Intellectual Property Office, the disclosure of which is hereby incorporated by reference as if fully set forth herein.

TECHNICAL FIELD

The disclosure relates to an apparatus and a method for charging and discharging electric vehicle, and more particularly, to an apparatus and a method for controlling a charging operation in the electric vehicle to effectively manage a power transfer between a smart grid and an electric vehicle.

BACKGROUND

Hybrid vehicles and electric vehicles are known as eco-friendly cars. Typically, a hybrid vehicle can be considered as a vehicle having two or more power sources, such as an engine and a motor, and an electric vehicle can be defined as a vehicle using a pure battery. The hybrid vehicle can turn on the generator during a running of the vehicle to self-charge the battery, and turn it into driving energy. In particular, a hybrid vehicle can use a regenerative braking system to convert a kinetic energy of an electric motor, which rotates reversely when the vehicle decelerates, into an electrical energy, store it in a battery, and use the energy stored in the battery during traveling to operate so that energy efficiency could increase.

On the other hand, electric vehicles are designed to be used after being charged like electronic products. However, using an electric vehicle can be very difficult if there is no infrastructure to charge the vehicle. To overcome this, a plug-in hybrid electric vehicle (PHEV) has been suggested. The plug-in hybrid vehicle (PHEV) is an energy-efficient vehicle that is halfway between a hybrid vehicle and an electric vehicle. The plug-in hybrid vehicle differs from a hybrid vehicle in that the driver plugs in the vehicle like an electric vehicle.

Plug-in hybrid vehicles and electric vehicles require an infrastructure to charge a battery in the vehicle. In addition, compatibility of infrastructures can be an important factor for E-Mobility for electric vehicles. The infrastructure that can charge the vehicle must be capable of charging multiple types of vehicles. Methods and techniques for charging the vehicle are becoming standardized by a standardization organization.

The Smart Grid can graft information and communication technology (ICT) technology onto existing power grids. The smart grid may include power grids that enable to exchange real-time power information in bi-direction between a supplier and a consumer to increase or optimize energy efficiency. Herein, bi-directional power supply refers to a supply system in which electric power can be supplied and received between a power grid and a consumer in a bidirectional manner, rather than one way of power supply to a conventional stage for power generation-transmission-distribution-sales. For example, in a system where unidirectional power is supplied, a consumer may only consume electricity, while a generator may generate and supply as much as the demand. In the smart grid system, however, the Energy Storage System (ESS) of the vehicle, which is charged fully or sufficiently, can use the remaining electrical energy to sell energy to an operator of the smart grid.

SUMMARY

The disclosure can provide an apparatus and a method for a bidirectional charging and discharging with an electric vehicle in a smart grid, in which an electric rate provided by a power system operator can be received via a power line communication (PLC) modem. The apparatus and the method can be for matching collected information with user's schedule to automatically calculate optimal or effective condition so as to supply and demand a power.

Further, the disclosure can provide an apparatus and a method for using a portable terminal (e.g., a smart phone) or an in-home terminal (e.g., a PC, a wall pad, or the like) to control or manage an effective power transfer between a house (home) and an electric vehicle based on few settings about user's or driver's utilization pattern.

In addition, the disclosure can provide a method and an apparatus for utilizing an On-Board Charger (OBC) mounted on a vehicle to transfer an electric power from a battery disposed in the vehicle to a battery disposed in a house (home) as well as to charge the battery mounted on the vehicle by using the battery disposed in the house. It is possible to provide a device and a method which can provide a solution about a balanced use of electric power to smoothly overcome a power supply and demand problem.

According to an exemplary embodiment of the present disclosure, an in-vehicle power system includes: a charging-discharging device configured to selectively perform both a charging function for receiving and delivering a first power signal and a discharging function for transmitting a second power signal; a battery configured to store an electrical energy transferred after DC conversion of the first power signal; and a charging-discharging controller configured to control the charging-discharging device based on a user's input or a predetermined control pattern.

The first power signal can be a kind of AC (Alternating Current) power signal, while the second power signal can be a kind of DC (Direct Current) power signal.

The charging-discharging device can be coupled to a single electric power inlet, disposed in a vehicle, for receiving the first power signal and transmitting the second power signal.

The charging-discharging device can be coupled to both a first electric power inlet for receiving the first power signal and a second electric power inlet for transmitting the second power signal. Herein, the first electric power inlet and the second electric power inlet are disposed in a vehicle.

The in-vehicle power system can further include a battery management system configured to monitor a charging status and a temperature of the battery and to report monitored data to the charging-discharging controller.

The predetermined control pattern can be determined based on at least one of a time zone, a fee schedule on the first power signal, and an option preset for charging the battery.

The fee schedule on the first power signal can be varied according to the time zone. Herein, the charging-discharging device can perform the charging function when a fee is high and the discharging function when the fee is low.

The discharging operation can be performed only when the battery is charged beyond the minimum charging requirement which is previously set.

The charging operation can be performed based on the fee schedule and a charging target amount of the battery.

The charging-discharging device can receive a third power signal distinguishable from the first power signal when the first power signal is not supplied.

The third power signal can be a kind of DC power signal.

The user's input can be entered via an audio-video-navigation device equipped in or mounted on a vehicle. Herein, the predetermined control pattern is stored in a storage device engaged with the audio-video-navigation device.

The entering the user's input and setting the predetermined control pattern can be performed via a wireless communication device engaged with the audio-video-navigation device.

The charging-discharging controller can be capable of delivering information about at least one of the charging operation, the discharging operation, a charging status of the battery.

According to another exemplary embodiment of the present disclosure, a method for charging or discharging a vehicle includes: receiving, by a controller, a first power signal in response to a fee schedule on the first power signal to charge a battery; and transmitting, by the controller, an electrical energy stored in the battery as a second power signal in response to the fee schedule when a charging status of the battery is beyond a predetermined level.

The receiving the first power signal can include converting the first power signal into a DC (Direct Current) power signal, and accumulating the DC power signal in the battery. Herein, the first power signal can be a kind of AC (Alternating Current) power signal.

The transmitting the electrical energy can be performed in response to user's input or a predetermined control pattern.

The predetermined control pattern can be determined based on at least one of a time zone, a fee schedule on the first power signal, and an option preset for charging the battery.

According to still another exemplary embodiment of the present disclosure, a power management system for use in a house includes: a power distributor coupled to a smart grid and configured to supply a first power signal for charging a vehicle; a battery configured to store an electrical energy delivered from the power distributor; and a power transfer supply configured to receive and transmit the electrical energy between the battery and the vehicle.

The power transfer supply can be configured to, in response to a request from the vehicle, either transmit the electrical energy stored in the battery or receive the electrical energy from the vehicle.

An apparatus for charging or discharging a vehicle can include a processing system that comprises at least one data processor and at least one computer-readable memory storing a computer program. Herein, the processing system is configured to cause the apparatus to receiving a first power signal in response to a fee schedule on the first power signal so as to charge a battery; and transmit an electrical energy stored in the battery as a second power signal in response to the fee schedule when a charging status of the battery is beyond a predetermined level.

Advantages, objects, and features of the invention will be set forth in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 shows an example of a charging operation corresponding to a bill/fee and user's setting about a charging mode; and FIG. 6 shows an example of power transfer according to charge and discharge modes.

DETAILED DESCRIPTION

Figure 1:
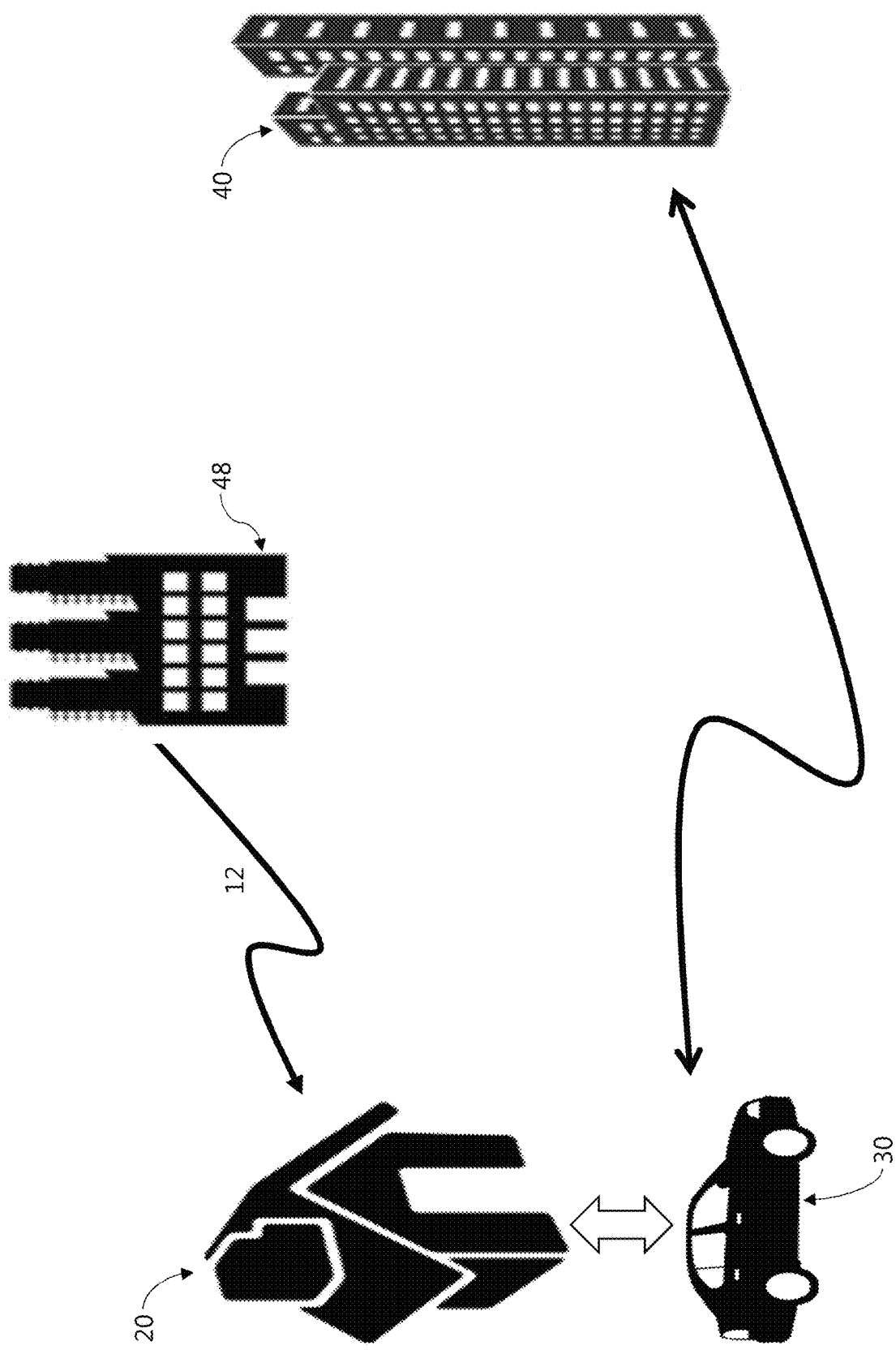
FIG. 1 is a diagram about power transfer using a smart grid.

Reference will now be made in detail to exemplary embodiments of the invention, examples of which are illustrated in the accompanying drawings. In the drawings, the same elements are denoted by the same reference numerals, and a repeated explanation thereof will not be given. The suffixes "module" and "unit" of elements herein are used for convenience of description and thus can be used interchangeably and do not have any distinguishable meanings or functions.

The terms "a" or "an", as used herein, are defined as one or more than one. The term "another", as used herein, is defined as at least a second or more. The terms "including" and/or "having" as used herein, are defined as comprising (i.e. open transition). The term "coupled" or "operatively coupled" as used herein, is defined as connected, although not necessarily directly, and not necessarily mechanically.

In the description of the invention, certain detailed explanations of related art are omitted when it is deemed that they may unnecessarily obscure the essence of the invention. The features of the invention will be more clearly understood from the accompanying drawings and should not be limited by the accompanying drawings. It is to be appreciated that all changes, equivalents, and substitutes that do not depart from the spirit and technical scope of the invention are encompassed in the invention.

Documents ISO/IEC 15118 and IEC 61851-1 are considered a kind of international standards for charging infrastructures. These standards are discussed and determined to improve basic compatibility or interoperability in communication procedures and signal processing procedures for efficient charging between electric vehicles and charge spots.

For instance, a Combo (Combined Charging System, referred as to Combo) method is a sort of charging standard for an electric vehicle (EV). A communication protocol used in the Combo, in which a normal charging and a quick or boost charging can be performed by a single connector, may be internationally standardized through a group of ISO/IEC 15118. Specifically, requirements of a physical layer and a data link layer of ISO/IEC 15118 are defined in ISO/IEC 15118-3, which can use IEEE 1901 Profile Green PHY and IEEE 802.3 MAC. The IEEE 1901 Profile Green PHY is a kind of an IEEE 1901 Profile criterion. The HomePlug Powerline Alliance determines the IEEE 1901 Profile Green PHY as HomePlug Green PHY (HPGP) based on a Power Line Communication (PLC) technology. HPGP technology is a broadband powerline communication technology using the 1.8-28 MHz band, and the communication speed can be about 10 Mbps.

Further, IEC 61851-1 (Electric Vehicle Conductive Charging System—Part 1: General Requirements), which is a kind of the standard of the charging system, may describe general matters such as a rated voltage and a current of the charging system, a charging connection method, a charging mode, a charging interface, and the like. IEC 61851-21-1 (Electric Vehicle Onboard Charger EMC Requirements for Conductive Connection to AC/DC Supply) may cover standards of electro-magnetic compatibility of on-board chargers, while IEC 61851-21-2 (EMC Requirements for Off Board Electric Vehicle Chargng Systems) may cover standards of electro-magnetic compatibility of DC chargers. In addition, IEC 61851-23 (DC Electric Vehicle Charging Station) may deal with developing a standard for an off-board charging system.

FIG. 1 is a diagram about power transfer using a smart grid.

As shown, a user or a driver can charge his or her electric vehicle 30 in his or her home (house, household) 20 and can move from his or her home 20 to an office building 40 that is set as a destination in the electric vehicle 30. The power generating facility or power supply facility 48 can supply an electric power required by the home 20 via a power line communication network (PLC) 12.

Generally, the electric power supplied to the house can be used to charge the electric vehicle 30, but an electrical energy stored in the electric vehicle 30 cannot be used by the house 20. To solve this issue, if the electrical energy stored in the electric vehicle 30 can be transferred to the home 20 and consumed within the home 20, the electric power can be used more efficiently.

The home 20 may have an electric outlet for charging the electric vehicle 30. The electric outlet may be connected to the electric vehicle 30 during a charging operation. The user or the driver can enter basic information about ruing schedule of the electric vehicle 30 on the next day via the personal PC (tablet PC), smart phone, or the like, which can be engaged with an in-vehicle terminal such as an audio-video-navigation (AVN). Particularly, using a terminal or a communication device, the user or the driver may enter or set a location of the house as a current location of the vehicle, a destination for estimating travelling distance and time, and a departure time for recognizing when a charging operation should be ended to start to operate. By way of example but not limitation, when setting information on the running schedule of the electric vehicle 30 and the charging schedule of the electric vehicle 30 on the next day, a charging operation can be performed more efficiently.

When a battery or an accumulator which is capable of charging and storing an electrical energy is disposed in, or equipped within, the home 20, an electric power can be transferred between the home 20 and the electric vehicle 30 through charging and discharging operations of the electric vehicle 30. By way of example but not limitation, a fee or a bill of the electric power supplied to the home 20 may vary depending on purpose of use or a time zone. If the electric power can be transferred between the home 20 and the electric vehicle 30, it is possible to charge the home 20 and the electric vehicle 30 at a more inexpensive time, and to transfer the electric power therebetween when it is hard to perform a charging operation.

It is possible to charge a battery, an accumulator, and the like disposed in the electric vehicle 30 and the home 20 at a time when the electric power is cheaper, and to use the stored electric power if necessary. For this purpose, it is necessary to inform the user of states of charge (SOC) of the battery and the accumulator which are disposed in both the electric vehicle 30 and the home 20. The state of charge (SOC) of the battery and the accumulator can be transmitted to a user or driver's terminal through a short-range wireless communication, a wireless communication technology, a wired communication technology, or the like. By way of example but not limitation, a power line communication (PLC) signal between a power line communication (PLC) modem installed in a vehicle and an in-home modem can be used to share information with user's terminal such as a wall pad in the home, a PC, a smartphone, or the like. Through user's terminal, the user or the driver can control a charging mode, a charging method, and the like.

The charging mode can be specifically set by the user. By way of example but not limitation, user's setting can include which charging mode is selected, such as an unconditionally full charging, a charging in response to a running schedule, a charging in response to a fee schedule of electric power, a quick, fast or boost charging, or the like, as well as requirements or conditions about the minimum state of charge (SOC) (threshold or offset value), the fee schedule allowing the minimum charging operation, or the like.

The power supply facility 48 may transmit a power line communication (PLC) signal including information such as an AC power and an electricity rate. The electric power supplied from the power supply facility 48 can be transmitted to a load (e.g., an electric lamp, a refrigerator, a washing machine, etc.) of the home 20 or can be supplied into the electric vehicle 30 through the distributor. The AC power supplied into the electric vehicle 30 is delivered into the battery in the vehicle via an on board charger (OBC) mounted on the vehicle. Herein, a battery management system (BMS) in the vehicle can check a status of the battery and control the charging operation.

Information of the power line communication (PLC) signal transmitted from the power supply facility 48 and information connected to the Internet can be converted into a power line communication (PLC) signal via a communication modem in the distributor disposed in the home 20, and then can be delivered into the electric vehicle 30.

In response to the information of the power line communication (PLC) signal which is transmitted to the electric vehicle 30, a power line communication (PLC) modem mounted on the electric vehicle 30 can consider an optimal condition to select a charging mode and a discharging mode. The electric vehicle 30 may perform a charging mode or a discharging mode in response to a user input or driver's input. However, according to an embodiment, the electric vehicle 30 may perform a charging mode or a discharging mode in response to according to the conditions automatically calculated by the power line communication (PLC) modem based at least on mode selection and schedule information according to the user's preference, an electric bill based on rate information included in the power line communication (PLC) signal.

If the rate of electric power supplied to the home is high when sufficient electrical energy is stored or accumulated in the battery mounted in the electric vehicle 30, the electric power stored in the electric vehicle 30 can be transferred to the home 20. This method can increase the economic efficiency of electric power usage in the home 20.

Figure 2:
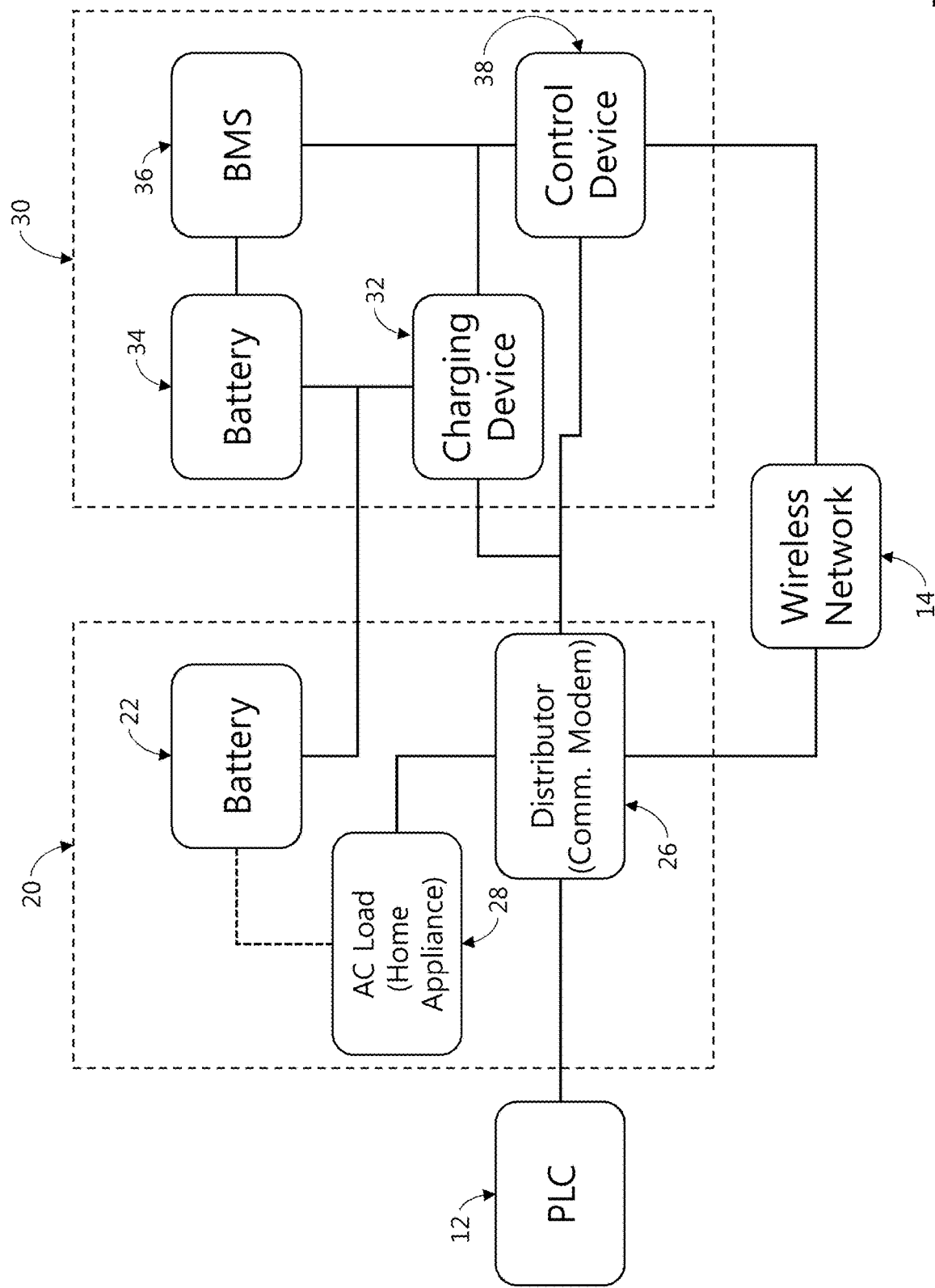
FIG. 2 describes a vehicle and a home for enabling power transfer in a smart grid.

FIG. 2 describes a vehicle and a home for enabling power transfer in a smart grid.

As shown, a power line communication network (PLC) can supply electric power to the home 20. A user or a driver can connect the electric vehicle 30 to the home 20 to charge a battery 34 mounted in the electric vehicle 30.

More specifically, an vehicular power device can include a charging-discharging device 32 configured to selectively perform one of a charging function for receiving and delivering a first power signal and a discharging function for transmitting a second power signal, a battery 34 configured to store the electrical energy, which is transferred after converted into a kind of DC power, and a charging-discharging controller 38 configured to control the charging-discharging device 32 in response to user's input or a predetermined control pattern.

The first power signal transmitted from the power line communication network 12 and delivered to the vehicle 30 via the distributor 26 disposed in the home 20 is a kind of alternating current (AC) power signal, while the second power signal transmitted from the charging-discharging device 32 may be a kind of direct current (DC) power signal. This is because the electrical energy stored in the battery 34 is in the form of DC power while a power signal transmitted through the power line communication network 12 is a sort of AC power signal. According to an embodiment, the charging-discharging device 32 may output an AC power signal, but in order that the charging-discharging device 32 outputs the AC power signal, the electrical energy stored in the battery 34 must be changed to an AC power signal again.

The charging-discharging device 32 may be implemented in a single module or an apparatus including a plurality of modules. Depending on design requirements of the charge reversal device 32 and the vehicle 30, the charging-discharging device 32 can be connected to a single electric power inlet, included in the vehicle 30, in order to receive the first power signal and transmit the second power signal. According to an embodiment, the charging-discharging device 32 may be connected to a first electric power inlet for receiving the first power signal in the vehicle 30 and a second electric power inlet, which is distinguishable from the first electric power inlet, for transmitting the second power signal.

The vehicular power device may further include a battery management system (BMS) 36 configured to monitor a state of charge and temperature of the battery 34 and report the state of charge and temperature to the charging-discharging controller 38. The BMS 36 can not only monitor a status of the battery 34 while the vehicle 30 is running, but can also report the status of the battery 34 during charging or discharging operation.

Herein, the charging-discharging controller 38 can be configured to control an operation of the charging-discharging device 32. The charging-discharging device 32 may be controlled in response to the input of user or driver, or may correspond to a predetermined control pattern that can be previously determined based on information set by the user or the driver. By way of example but not limitation, the predetermined control pattern may be determined according to at least one of a time zone, a rate/bill for the first power signal, and an option for charging the battery.

The charging-discharging controller 38 can be configured to receive signals regarding an operation for charging the vehicle 30 from the distributor 26 disposed in the home 20, and to control the charging-discharging device 32 and the battery management system 36 based on received signals. The charging-discharging controller 38 can control an operation for charging the battery 34 by using a power signal delivered from an outside of the vehicle.

The rate/bill of the first power signal transmitted through the distributor 26 may vary according to a time zone. By way of example but not limitation, the charging-discharging device 32 can perform the charging function when the rate is low and perform the discharging function when the rate is high. The vehicle 30 can be charged at the home 20 with a domestic rate which is different from a commercial rate when charged at a charging station located on a road or in an urban. In particular, since the vehicle 30 charged at the home 20 can have much more time for charging the battery 34, it is necessary to perform the charging function in response to an amount of power supplied to the home 20 and the electric power rate. By way of example but not limitation, in a case when the distributor 26 and the charging-discharging device 32 are connected with each other a long time, the charging-discharging device 32 can charge the battery 34 in the vehicle 30 during a time when the rate of electric power is low, and avoid charging the battery 34 in the vehicle 30 when the rate is high.

On the other hand, when the battery 34 is charged larger than the minimum requirement of remaining state of charge, the charging-discharging device 32 may perform the discharging function corresponding to the input of a user or a driver or the predetermined control pattern. By way of example but not limitation, if the state of charge (SOC) of the battery 34 in the vehicle 30 is sufficient (e.g., 80%), the electrical energy stored in the battery 34 in the vehicle 30 can be transferred into the home 20. After the electrical energy stored in the battery 34 in the vehicle 30 is utilized first when the rate of the first power signal supplied to the home 20 through the power line communication network 12 is high, the battery 34 in the vehicle 30 can be charged later when the rate of the first power signal is low. In this case, the rates/bills for the amount of electric power consumed by both the home 20 and the vehicle 30 can be decreased or lowered.

As above described, in order to transfer electric power from the vehicle 30 to the home 20, the home 20 could have a battery 22. The battery 22 disposed in the home 20 can temporarily store electrical energy and can be used as a power source for a load 28, such as household appliances, lights, and etc., included in the home 20. When the rate/bill of the first power signal supplied to the home 20 is low, the distributor 26 can supply an electric power to the load 28. However, when the rate of the first power signal is high, the distributor 26 may use the electrical energy stored in either the battery 22 of the home 20 or the battery 34 in the vehicle 30 as a power source for the load 28 rather than supplying an electric power delivered from an external to the load 28.

The battery 34 in the vehicle 30 and the battery 22 in the home 20 can transfer the electric power in response to user's input or a predetermined control pattern. By way of example but not limitation, if the electric power may be transferred between the battery 34 in the vehicle 30 and the battery 22 in the home 20 even when the first power signal supplied to the home 20 is blocked for various reasons, the electric power can be used more efficiently. When the battery 34 in the vehicle 30 needs to be charged but the first power signal through the distributor 26 is not supplied, the electrical energy stored in the battery 22 in the home 20 may be used for charging the vehicle 30. That is, when the first power signal is not supplied, the charging-discharging device 32 can receive from the battery 22 a third power signal that is distinguishable from the first power signal. Herein, the third power signal may be a kind of DC power signal.

The charging-discharging device 32 can perform the charging function according to a rate/bill of electric power and a target charging amount of the battery. Sometimes, it may be hard to couple the vehicle 30 with the distributor 26 in the home 20 so as to charge the vehicle 30. In this case, the charging function using an power signal supplied from an external may be performed corresponding to user's or driver's input or a factor such as a rate included in a predetermined control pattern, a target charging amount of the battery, and the like. By way of example but not limitation, when a charging rate of the first power signal supplied to the home 20 is high and a charging target amount of the battery is set to 70% instead of 100%, the charging function may not be executed when a state of charge in the battery reaches to the charging target amount.

The user's input may be delivered via an audio-video-navigation device mounted on the vehicle. For the way of example but not limitation, a charging or a discharging option suitable for user's preference may be selected via an input button provided in an audio-video-navigation device, a touch screen, or the like, which is mounted on the vehicle 30. In addition, the contents inputted or set by the user or the driver can be used as a predetermined control pattern stored in a storage device engaged with the audio-video-navigation device.

According to an embodiment, the user or the driver can access the charging-discharging controller 38 via a wireless communication network 14, a local area network, etc. instead of the audio-video-navigation device mounted on the vehicle. It is possible to connect a mobile terminal or a personal computer, possessed by a user or a driver, with the charging-discharging controller 38 through a wireless communication network 14, a near-field communication network, or the like. By way of example but not limitation, the user or the driver can use the charging-discharging controller 38 or the audio-video-navigation device mounted on the vehicle via the wireless communication network 14 or the local area network to determine a charging method, a charging time, a charging time zone, a charging rate/bill and so on. For example, the user or the driver can access the charging-discharging controller 38 in the vehicle 30 via the wireless communication network 14 using a computing device such as a portable terminal so as to monitor or control the charging operation and the state of charge.

On the other hand, the residential power management apparatus disposed in the home 20 may include a distributor 26 connected to the power line communication network to use a first power signal for charging the vehicle 30. Herein, the first power signal may comprise an alternating voltage. In addition, the home 20 may further include a battery 22 which can store electrical energy in the form of a DC voltage converted from the alternating voltage. On the other hand, it is unlikely that the converter 20 configured to convert the first power signal, which is a form of AC voltage, into the form of DC voltage, and to deliver converted signal into the battery 22 is provided in the home 20. It might be difficult to store electrical energy in the home 20 even though the battery 22 is disposed in the home 20. However, since the vehicle 30 includes the function of converting the supply power (for example, converting from AC to DC), the charging-discharging device 32 in the vehicle 30 could be used for charging the battery 22 in the home 20. That is, the battery can receive electrical energy through the charging-discharging device 32 mounted on the vehicle 30. According to an embodiment, the battery 22 in the home 20 may be coupled to a plurality of electric power inlets including a second electric power inlet used for receiving the second power signal transmitted from the vehicle 30.

As not shown, the residential power management apparatus may further include a battery management device capable of charging the battery 22 in response to the rate of the first power signal, and monitoring a state of charge and a temperature of the battery 22.

It is possible to enable bi-directional power transfer between the battery 22 in the home 20 and the battery 34 in the vehicle 30 through the charging-discharging device 32 mounted on the vehicle 30. Such bi-directional power transfer may be performed in consideration of factors such as the state of remaining charge of the battery 34 in the vehicle 30, the time required for full charging, the electric power rate (e.g., a rate per hour of electricity supplied via the power line communication network 12, or the like).

According to an embodiment, in a case when the battery 34 in the vehicle 30 is fully charged, the charging-discharging device 32 mounted on the vehicle 30 converts the electric power transmitted from the distributor 26 to charge the battery 22 in the home 20. The operation of the charging-discharging device 32 may be performed in consideration of factors such as the state of remaining charge of the battery 34 in the vehicle 30, the time required for full charging, the electric power rate (e.g., a rate per hour of electricity supplied via the power line communication network 12, or the like).

The distributor 26 included in the residential power management apparatus can supply a fourth power signal to the load 28, including home appliances and the like, used in the home and can determine billing information based on the usage amount of the first power signal and the second power signal. The distributor 26 may include a communication modem and receive power signals, billing information, etc. from a service provider via the wireless communication network 14 and the power line communication network (PLC) 12 and be coupled to a portable terminal, a home PC or the like.

Figure 3A:
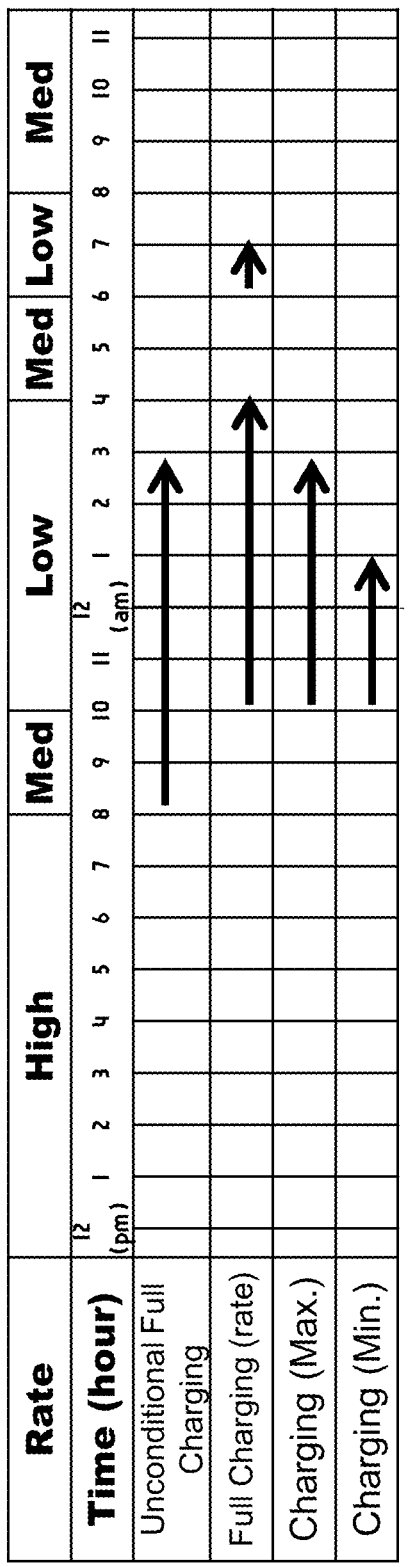
FIGS. 3A to 3C show charging and discharging operations corresponding to a time zone and a bill/fee.
Figure 3B:
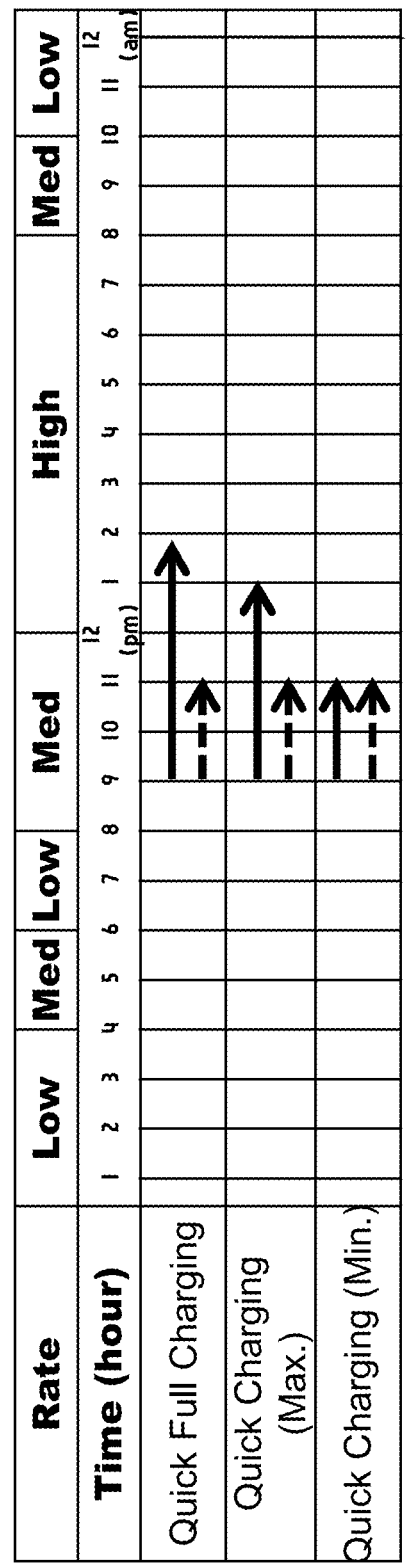
Figure 3C:
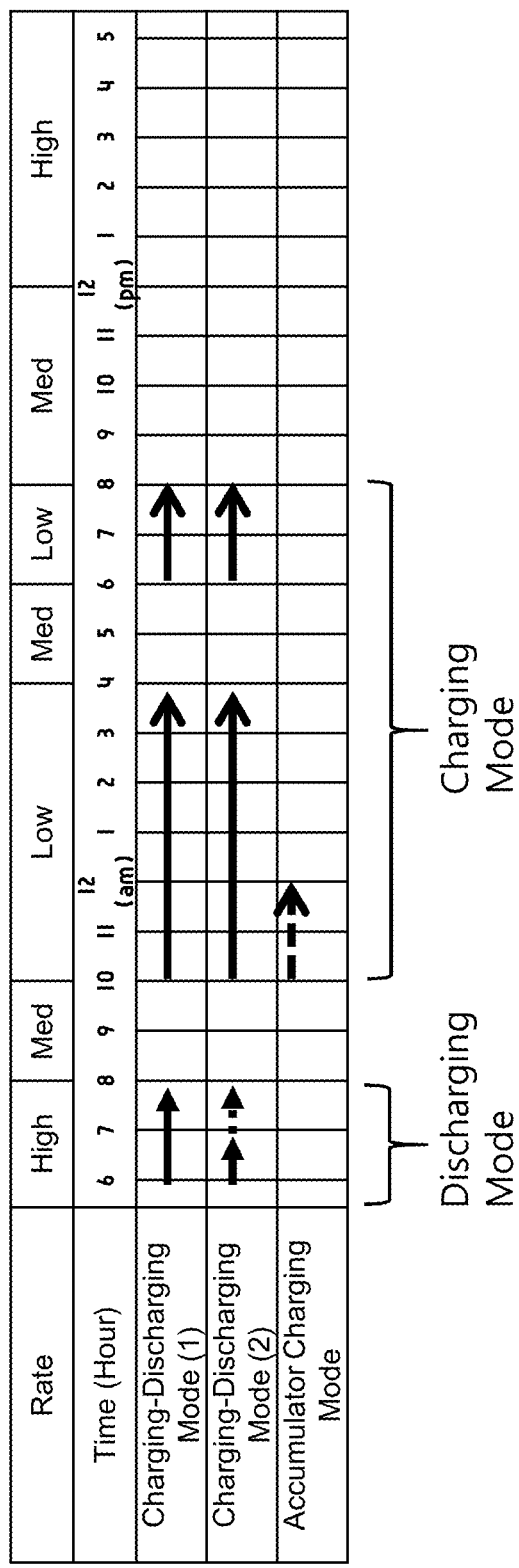

FIGS. 3A to 3C show charging and discharging operations corresponding to a time zone and a bill/fee/rate. More specifically, it may be assumed that the total capacity of the battery mounted on the vehicle is 30 kWh, the total capacity of the battery placed in the home is 15 kWh, the vehicle is an hourly charge capacity 3 kW, and the fuel economy of the vehicle is 10 km/kWh.

In FIG. 3A, it is assumed that a state of charge (SOC) of the battery mounted on the vehicle is 9 kWh (about 30% of the whole), a charging start time set by a user is 20:00 (8 pm), and a driving distance on the next day is 30 km (60 km for round trip). FIG. 3A explains the mode of charging the vehicle through an electric power supplied to the home.

The charging function may be performed differently depending on an option for charging mode set by the user.

First, in a case when the option for charging mode is an unconditionally full charging, charging the vehicle can be completed up to 3 am for 7 hours continuously regardless of the charging rate by charging electric power of 21 kW necessary for full charging after starting to charge the vehicle (e.g., connection with an outlet).

In a case when the charging mode is selected as a full charging according to a fee schedule on electricity, seven hours for charging electric power of 21 kW necessary for fully charging the vehicle may be composed of six hours from 10 pm to 4 am and one hour from 6 am to 7 am.

Further, when the charge mode is selected as a maximum amount charging, charging operation can be performed based on the maximum charging amount which the user can set. If the maximum charging amount is set to 80% (24 kWh), charging the deficiency 50% (15 kWh) requires 5 hours so that the charging operation can be performed until 3 am.

In addition, when the charging mode is selected as a minimum amount charging, charging operation can be performed based on the minimum charging amount, which is considered a reserved amount (offset), and a requested amount determined by a user based on an estimated driving distance on the next day and. If the minimum charging amount is 40% (12 kWh), deficiency would be 10% (3 kWh, 1 hour) and the requested amount (6 kWh, 2 hours) can be determined based on the estimated driving distance 60 km for user's next day schedule. Thus, the charging operation may be performed for 3 hours until 1 am.

Referring to FIG. 3B, it is assumed that a current state of charge (SOC) of the battery mounted on the vehicle is kWh (10%) while a current state of charge (SOC) of the battery disposed in the home is 12 kWh (80%). The user or the driver determines that a time of starting a charging operation is 9 am, vehicle's departure time on tomorrow is 2 pm, and a calculated driving distance to the destination on tomorrow is km (180 km for round trip). Herein, a first charging operation (solid line) using an electric power supplied to the home and a second charging operation (dotted line) using the battery placed in the home can be performed together.

When a charging mode set by the user is a quick full charging, the state of charge SOC in the vehicle is not sufficient and the estimated distance to the destination is too long. Thus, charging the vehicle about deficiency 90% (27 kWh) can be achieved by performing the second charging operation using the battery in the home for deficiency 12 kWh (40%) and the first charging operation using the distributor for the remaining 50% (15 kWh, 5 hours) in parallel. Then, the charging operation may be performed until 2 pm.

Further, when the charging mode is selected as a maximum amount charging, charging operation can be performed based on the maximum charging amount which the user can set. If the maximum charging amount is set to 80% (24 kWh) and the deficiency is 12 kWh when the state of charge SOC in the vehicle is 12 kWh, a charging operation may require 4 hours so that the charging operation can be performed until 1 pm.

In addition, when the charging mode is selected as a minimum amount charging, the minimum amount of charging may be set to 10% (3 kWh) and a required amount to the destination may be 12 kWh based on an estimated driving distance of 120 km. In this case, the minimum amount of 3 kWh is the same with the state of charge in the battery 3 kWh, so deficiency 12 kWh (40%) can be charged up to 20% (6 kWh) by using the battery in the home and another 20% (6 kWh) by using the distributor, and can be charged until 11 o'clock. For the way of example but not limitation, when the electricity rate supplied through the power line communication is 'medium' or 'high,' the electric power stored in the battery disposed in the home can be first used for charging, and when the rate is 'low,' the supplied power from an external can be used with a priority.

Referring to FIG. 3c, it may be assumed that the state of charge (SOC) of a battery mounted on a vehicle is 21 kWh (70%), and the state of charge (SOC) of a battery placed in the home is 9 kWh (60%), and an hourly usage in the home is 3 kWh. The user or the driver assumes that a time of starting a charging operation is 6 pm, vehicle's departure time on tomorrow is 2 pm, and an estimated distance to the next destination is 5 km (10 km for round trip). Herein, the discharging operation and the charging operation can occur in each time zone, and it is possible to charge the battery in the vehicle or discharge the battery in the vehicle (solid line), as well as to charge the battery in the home or discharge the battery in the home (dotted line).

In the discharging mode, if the minimum required residual amount of the battery mounted on the vehicle is set to 20% (6 kWh), the battery may be discharged about 6 kWh during two hours (i.e., 6 pm to 8 pm) when the rate of electricity is high, but later charged about 15 kWh for 5 hours among six hours (i.e., 10 pm to 4 am) and two hours (6 am to 8 am) when the electricity rate is low.

In the discharge mode, the minimum required level of the battery may be set to 60% (18 kWh). In this case, when the rate of electricity is high (e.g., 6 pm to 8 pm), about 10% (3 kWh) may be transferred from the battery in the vehicle battery. Further, the discharged battery in the vehicle can be charged when the electricity rate is low (i.e., 10 pm to 4 am and 6 am to 8 am), based on at least one method described in FIGS. 3A and 3B.

To charge a battery disposed in the home, plural charging modes for the battery in the vehicle described in FIGS. 3A and 3B can be utilized. In addition, when the electricity rate is low (i.e., 10 pm to 4 am and 6 am to 8 am), it is possible to additionally charge the battery disposed at the home about 6 kWh. According to an embodiment, it is possible to sell stored electrical energy to others in a time zone in which the electric rate is high.

Figure 4:
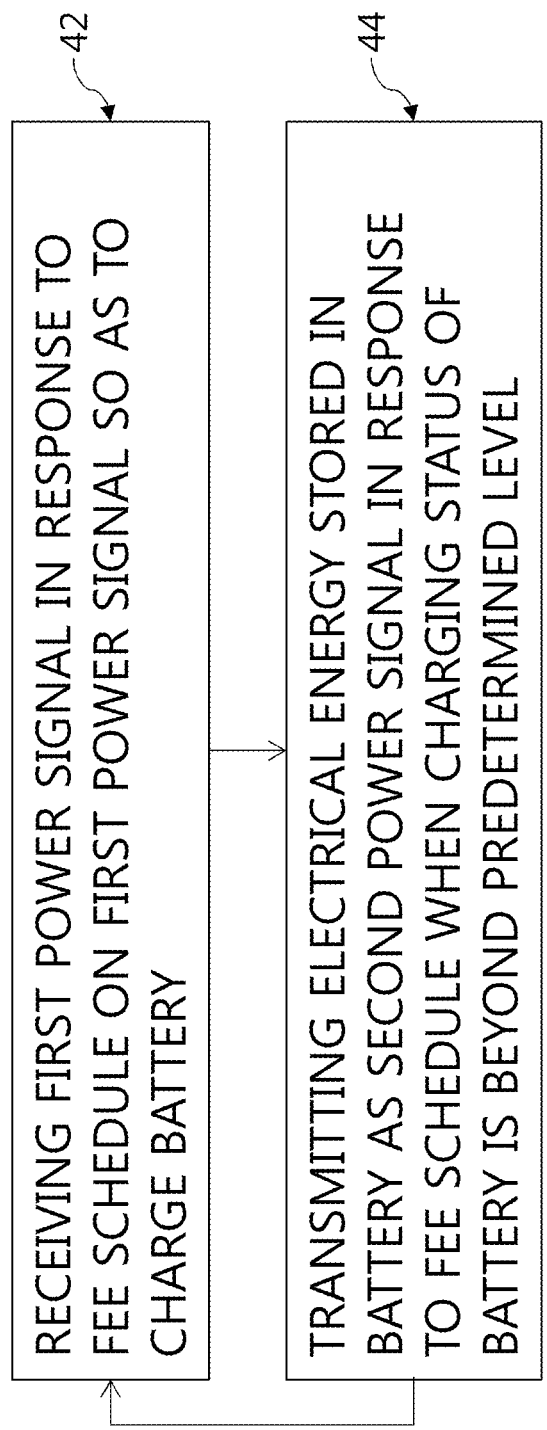
FIG. 4 describes a method for charging and discharging a vehicle.

FIG. 4 describes a method for charging and discharging a vehicle.

As shown, a method for charging or discharging a vehicle can include receiving a first power signal in response to a fee schedule on the first power signal so as to charge a battery (step 42), and transmitting an electrical energy stored in the battery as a second power signal in response to the fee schedule when a charging status of the battery is beyond a predetermined level (step 44). As not shown, receiving the first power signal (step 42) may include converting the first power signal into a DC (Direct Current) power signal, and accumulating the DC power signal in the battery. Herein, the first power signal delivered via a power line communication (PLC) is a kind of AC (Alternating Current) power signal, while a DC (Direct Current) power signal may be stored in the battery. Further, the receiving the first power signal (step 42) can be performed according to a rate of electricity and/or a target charging amount of the battery included in the vehicle.

On the other hand, the transmitting the electrical energy (step 44) may be performed in response to a user's input or a predetermined control pattern. Herein, wherein the predetermined control pattern is determined based on at least one of a time zone, a fee schedule on the first power signal, and an option preset for charging the battery.

By way of example but not limitation, since a rate of the first power signal supplied for charging the vehicle may vary depending on a time (or a time zone), the receiving the first power signal to charge the battery (step 42) can be performed when the rate is low, while the transmitting the second power signal (step 44) can be performed when the rate is high.

More specifically, both the charging operation (step 42) and the discharging operation (step 44) may be performed split-time in response to user's input or the predetermined control pattern. Herein, regardless whether a user or a driver designates or determines charging operation split-time, when user's preference about few factors is set or stored, the predetermined control pattern can be generated corresponding to user's preference.

The various embodiments disclosed herein, including embodiments of an apparatus and a method for charging and discharging electric vehicle and/or elements thereof, can be implemented using a controller such as electronic control unit (ECU) to perform the functions described above including the functions described in relation to the charging-discharging device 32, the BMS 36, and the charging-discharging controller 38. That is, the charging-discharging device 32, the BMS 36, and the charging-discharging controller 38 may be controlled by or embedded in the controller.

FIG. 5 shows an example of a charging operation corresponding to a bill/fee and user's setting about a charging mode.

As shown, as a charge mode, one of an unconditional mode, the maximum charging amount, the minimum charging amount, or the like may be selected or determined. Such a charging mode for the vehicle may be set different from that for the house, or the charging modes for them may be set the same. On the other hand, according to an embodiment, when the charging mode for the vehicle is set, the charging mode for the battery disposed at the home may be engaged or linked with the charging mode for the vehicle.

A rate/bill for electricity supplied to a residence, home may vary. Herein, for description, the rate could be classified as 'low', 'medium', and 'high'. The charging mode can automatically determine a charging pattern based on a rate/bill of commercial electric power transmitted through power line communication or a predetermined preference about rate/bill based on a charging option set by the user. Briefly, when the rate of electric power is low, the charge mode can be performed until the battery included in the vehicle and the house is fully charged. However, when the rate of power is in the midium or high, the batteries included in the house and the vehicle may be selectively charged.

By way of example but not limitation, in a case of charging the vehicle, when the rate of electricity at the current time zone is high, there is no need to perform the charging operation immediately if there is a low rate time zone before a user or driver operates the vehicle the next time. However, the battery in the vehicle should be charged if there is no a low rate time zone until a user or driver operates the vehicle the next time. On the other hand, in the case of a house, unlike the vehicle, since the house can be supplied with an electric power all day long, it may become unnecessary to charge the battery disposed in the house when the rate of supplied electric power is high.

FIG. 6 shows an example of power transfer according to charge and discharge modes.

As shown, both the charging operation and the discharging operation for electric power transfer may be determined in response to a rate/bill of electric power supplied to the home. According to an embodiment, the vehicle may selectively perform one of the charging operation and the discharging operation, or may perform the charging operation and the discharging operation at the same time. The number of electric power inlet and an internal design of the charging device may vary depending on whether both the charging mode and the discharging mode can be performed at the same time.

By way of example but not limitation, when the rate of electric power supplied to the home is low, the vehicle does not need to transmit electrical energy stored in the battery included in the vehicle. This is because it is possible to use low-priced electricity to charge the battery in the home.

On the other hand, when the rate of electric power supplied to the home is high, the electrical energy stored in the battery of the vehicle can be transmitted to, and used by, the home, depending on whether the vehicle is operated or not. In this case, more inexpensive electric power may be available at home, and the battery inside the vehicle can be charged later when the rate of electric power becomes lowered.

In embodiments, user's inconvenience on a bi-directional power supply system in a conventional electric vehicle may be considered and improved because the charging system is implemented as a power supplier or a developer of the bi-directional power supply system. A user or a driver can effectively control or manage an electric power by only a simple input through a wall pad, an AVN in the vehicle, and the like.

In addition, through embodiments, it is possible to overcome user's inconvenience that the driver or the user should know a rate of electricity or analysis the rate to obtain an economical solution as well as that the driver or the user should input detailed values or references for charging operation. The embodiments can automatically provide effective or efficient management about usage of the electric power so as to reduce an electricity bill on the electric power supplied through the power line communication.

As above mentioned, embodiments can achieve efficient management (e.g., transfer, consumption, storage, and etc.) regarding an electric power by simple user's manipulation through a terminal that can be easily controlled by a user such as a smart phone, a home PC, a wall pad, an in-vehicle audio-video-navigation (AVN), and the like.

In addition, embodiments can efficiently manage the electric power used and stored in an electric vehicle and a house (home), thereby reducing bills or utility fees on used electric power even if a user consumes the same amount of electric power.

Further, embodiments can provide an apparatus capable of supplying an electric power in a home in a case of emergency such as a natural disaster, a power failure, and the like. Further, it is advantageous that an electric vehicle can be quickly charged at a home without using a charging station when the electric vehicle is urgently charged.

The aforementioned embodiments are achieved by invention in a predetermined manner. Each of the structural combination of structural elements and features of the elements or features can be considered selectively unless specified separately. Each of the structural elements or features may be carried out without being combined with other structural elements or features. Also, some structural elements and/or features may be combined with one another to constitute the embodiments of the invention. The order of operations described in the embodiments of the invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

It will be apparent to those skilled in the art that various modifications and variations can be made in the present invention without departing from the spirit or scope of the inventions. Thus, it is intended that the invention covers the modifications and variations of this invention provided they come within the scope of the appended claims and their equivalents.

What is claimed is:

1. An in-vehicle power system, comprising:
a charging-discharging device configured to selectively perform both a charging function for receiving and delivering a first power signal and a discharging function for transmitting a second power signal;
a battery configured to store an electrical energy transferred after DC conversion of the first power signal; and
a charging-discharging controller configured to control the charging-discharging device based on a user's input and a predetermined control pattern,
wherein the user's input includes basic information about a running schedule of the vehicle and a charging schedule of the vehicle on the next day,
wherein the basic information includes at least one of a current location of the vehicle, a destination of the vehicle, and a departure time of the vehicle,
wherein the predetermined control pattern is determined based on at least one of a time zone, a fee schedule on the first power signal, and an option preset for charging the battery,
wherein the fee schedule on the first power signal varies according to the time zone,
wherein the charging-discharging device performs the discharging function when a fee is high and performs the charging function when the fee is low,
wherein the discharging operation is performed only when the battery is charged beyond a preset minimum charging requirement,
wherein the minimum charging requirement is set to 20% or 60%,
wherein the charging function is performed differently depending on an option for charging mode set by the user,
wherein the charging mode is selected as one of an unconditionally full charging, a full charging according to the fee schedule, a maximum amount charging, a minimum amount charging, a quick full charging, a quick maximum amount charging, and a quick minimum amount charging, and
wherein when the charging mode set by the user is any one of the quick full charging, the quick maximum amount charging, and the quick minimum amount charging, the charging function is performed by receiving the second power signal from a battery in a house and by receiving the first power signal from a power distributor coupled to a smart grid in parallel.

2. The in-vehicle power system according to claim 1, wherein the first power signal is an Alternating Current (AC) power signal, while the second power signal is a Direct Current (DC) power signal.

3. The in-vehicle power system according to claim 1, wherein the charging-discharging device is coupled to a single electric power inlet, which is disposed in a vehicle, for receiving the first power signal and transmitting the second power signal.

4. The in-vehicle power system according to claim 1, wherein the charging-discharging device is coupled to both a first electric power inlet for receiving the first power signal and a second electric power inlet for transmitting the second power signal, wherein the first electric power inlet and the second electric power inlet are disposed in a vehicle.

5. The in-vehicle power system according to claim 1, further comprising:
a battery management system (BMS) configured to monitor a charging status and a temperature of the battery and to report monitored data to the charging-discharging controller.

6. The in-vehicle power system according to claim 1, wherein the charging operation is performed based on the fee schedule and a charging target amount of the battery.

7. The in-vehicle power system according to claim 1, wherein the charging-discharging device receives a third power signal distinguishable from the first power signal when the first power signal is not supplied.

8. The in-vehicle power system according to claim 7, wherein the third power signal is a DC power signal.

9. The in-vehicle power system according to claim 1, wherein the user's input is entered via an audio-video-navigation device of a vehicle, and
wherein the predetermined control pattern is stored in a storage engaged with the audio-video-navigation device.

10. The in-vehicle power system according to claim 9, wherein the entering the user's input and setting the predetermined control pattern can be performed via a wireless communication device engaged with the audio-video-navigation device.

11. The in-vehicle power system according to claim 10, wherein the charging-discharging controller delivers information on at least one of the charging operation, the discharging operation, and a charging status of the battery.

12. A method for charging or discharging a battery in a vehicle, comprising:
receiving a user's input including basic information about a running schedule of the vehicle and a charging schedule of the vehicle on the next day;
receiving, by a charging-discharging device, a first power signal in response to a fee schedule on the first power signal or the user's input to charge the battery; and
transmitting, by the charging-discharging device, an electrical energy stored in the battery as a second power signal in response to the fee schedule when a charging status of the battery is beyond a predetermined level,
wherein the basic information includes at least one of a current location of the vehicle, a destination of the vehicle, and a departure time of the vehicle,
wherein the predetermined level is set to 20% or 60%,
wherein the user's input includes an option for charging mode,
wherein the charging mode is selected as one of an unconditionally full charging, a full charging, a maximum amount charging, a minimum amount charging, a quick full charging, a quick maximum amount charging, and a quick minimum amount charging, and
wherein when the charging mode set by the user is any one of the quick full charging, the quick maximum amount charging, and the quick minimum amount charging, the charging function is performed by receiving the second power signal from a battery in a house and by receiving the first power signal from a power distributor coupled to a smart grid in parallel.

13. The method according to claim 12, wherein the receiving the first power signal includes:
   converting the first power signal into a direct current (DC) power signal; and
   accumulating the DC power signal in the battery,
   wherein the first power signal is an alternating current (AC) power signal.

14. The method according to claim 12, wherein the transmitting the electrical energy is performed in response to the user's input or a predetermined control pattern.

15. The method according to claim 14, wherein the predetermined control pattern is determined based on at least one of a time zone, the fee schedule on the first power signal, and an option preset for charging the battery.

* * * * *